(12) United States Patent
Hattori et al.

(10) Patent No.: US 11,972,560 B2
(45) Date of Patent: Apr. 30, 2024

(54) MACHINE LEARNING DEVICE, IMAGE DIAGNOSIS SUPPORT DEVICE, MACHINE LEARNING METHOD AND IMAGE DIAGNOSIS SUPPORT METHOD

(71) Applicant: HITACHI HIGH-TECH CORPORATION, Tokyo (JP)

(72) Inventors: Hideharu Hattori, Tokyo (JP); Yasuki Kakishita, Tokyo (JP); Kenko Uchida, Tokyo (JP); Sadamitsu Aso, Tokyo (JP); Toshinari Sakurai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 651 days.

(21) Appl. No.: 17/254,547

(22) PCT Filed: Jun. 24, 2019

(86) PCT No.: PCT/JP2019/024953
§ 371 (c)(1),
(2) Date: Dec. 21, 2020

(87) PCT Pub. No.: WO2020/012935
PCT Pub. Date: Jan. 16, 2020

(65) Prior Publication Data
US 2021/0271929 A1   Sep. 2, 2021

(30) Foreign Application Priority Data

Jul. 9, 2018 (JP) ................. 2018-129776

(51) Int. Cl.
*G06T 7/00* (2017.01)
*G06F 18/214* (2023.01)
(Continued)

(52) U.S. Cl.
CPC ........ *G06T 7/0012* (2013.01); *G06F 18/2148* (2023.01); *G06F 18/241* (2023.01); *G06N 5/04* (2013.01); *G06N 20/00* (2019.01)

(58) Field of Classification Search
None
See application file for complete search history.

(56) References Cited

U.S. PATENT DOCUMENTS

2013/0282635 A1   10/2013  Dull et al.

FOREIGN PATENT DOCUMENTS

| JP | 2008152611 A | * | 7/2008 |
| JP | 2009259030 A | * | 11/2009 |

(Continued)

OTHER PUBLICATIONS

International Search Report, PCT/JP2019/024953, dated Sep. 3, 2019 (2 pgs.).

(Continued)

*Primary Examiner* — Jiangeng Sun
(74) *Attorney, Agent, or Firm* — Volpe Koenig

(57) ABSTRACT

A machine learning device with a processor and a memory, in which the processor receives an image and calculates a feature amount of an object included in the image, the processor identifies a local part from the feature amount and calculates a local identification value, the processor calculates an overall identification value using the local identification value, and the processor generates a classifier using the local identification value and the overall identification value and stores it in the memory.

12 Claims, 12 Drawing Sheets

(51) Int. Cl.
*G06F 18/241* (2023.01)
*G06N 5/04* (2023.01)
*G06N 20/00* (2019.01)

(56) References Cited

FOREIGN PATENT DOCUMENTS

| | | | | |
|---|---|---|---|---|
| JP | 2011-215883 | A | 10/2011 | |
| JP | 4846924 | B2 * | 12/2011 | ......... G06K 9/00973 |
| JP | 2012-073179 | A | 4/2012 | |
| JP | 2016029568 | A * | 3/2016 | |
| WO | WO-2014075174 | A1 * | 5/2014 | ......... G06K 9/00154 |

OTHER PUBLICATIONS

1 Extended European Search Report dated Mar. 23, 2022 for European Patent Application No. 19833707.3.

* cited by examiner

1500 REMOTE DIAGNOSIS SUPPORT SYSTEM

1600 NETWORK ENTRUSTMENT SERVICE PROVIDING SYSTEM

MACHINE LEARNING DEVICE, IMAGE DIAGNOSIS SUPPORT DEVICE, MACHINE LEARNING METHOD AND IMAGE DIAGNOSIS SUPPORT METHOD

INCORPORATION BY REFERENCE

The present application claims the priority of Japanese Patent Application No. 2018-129776, which is a Japanese application filed on Jul. 9, 2018, and incorporates it into this application by referring to its contents.

TECHNICAL FIELD

The present invention relates to a machine learning device and method, an image diagnosis support device and system, and an image diagnosis support method.

BACKGROUND ART

In recent years, in image recognition technology, an image recognition technology using machine learning such as Deep Learning has been studied. By using Deep Learning, the detection accuracy of objects in the image is improved.

For example, a technique proposed in Patent Literature 1 is known for developing a classifier for detecting an object in an image. In Patent Literature 1, a neural network that connects each hidden layer directly to an output layer is constructed to perform machine learning, and features of an object in an image are extracted to identify an object.

CITATION LIST

Patent Literature

PTL 1: U.S. Patent Application Publication No. 2013/282635

SUMMARY OF INVENTION

Technical Problem

However, as in Patent Literature 1, even if machine learning is performed by directly connecting each hidden layer to the output layer, unintended features in the image are extracted, so that there is a problem of detection omission or false detection of an object in the image.

Similarly, in Patent Literature 1, even if tissues and cells in a tissue or cell image are classified, abnormal tissues (e.g. cancer) and abnormal cells (e.g. cancer) cannot be detected, so that there is a problem of detection omission or false detection.

The present invention has been made in view of such a situation, and provides a technique for realizing the classification of objects (for example, tissues, cells, etc.) in the image by adding a configuration for automatically extracting the intended feature of the image from the image and changing the feature to be machine-learned in the neural network.

Solution to Problem

The present invention is a machine learning device with a processor and a memory, in which the processor receives an image and calculates a feature amount of an object included in the image, the processor identifies a local part from the feature amount and calculates a local identification value, the processor calculates an overall identification value using the local identification value, and the processor generates a classifier using the local identification value and the overall identification value and stores the classifier in the memory.

Advantageous Effects of Invention

According to the present invention, even if it is not possible to determine whether or not the object is an object to be detected only by the features automatically extracted by machine learning of a neural network, the intended features of an image can be automatically extracted. By changing the features of machine learning with a neural network, it becomes possible to realize classification of objects (for example, tissues, cells, etc.) in an image.

Details of at least one implementation of a subject matter disclosed herein are described in the accompanying drawings and in the description below. Other features, aspects, and effects of the disclosed subject matter are made clear in the disclosures, drawings, and claims below.

DESCRIPTION OF EMBODIMENTS

Figure 1:
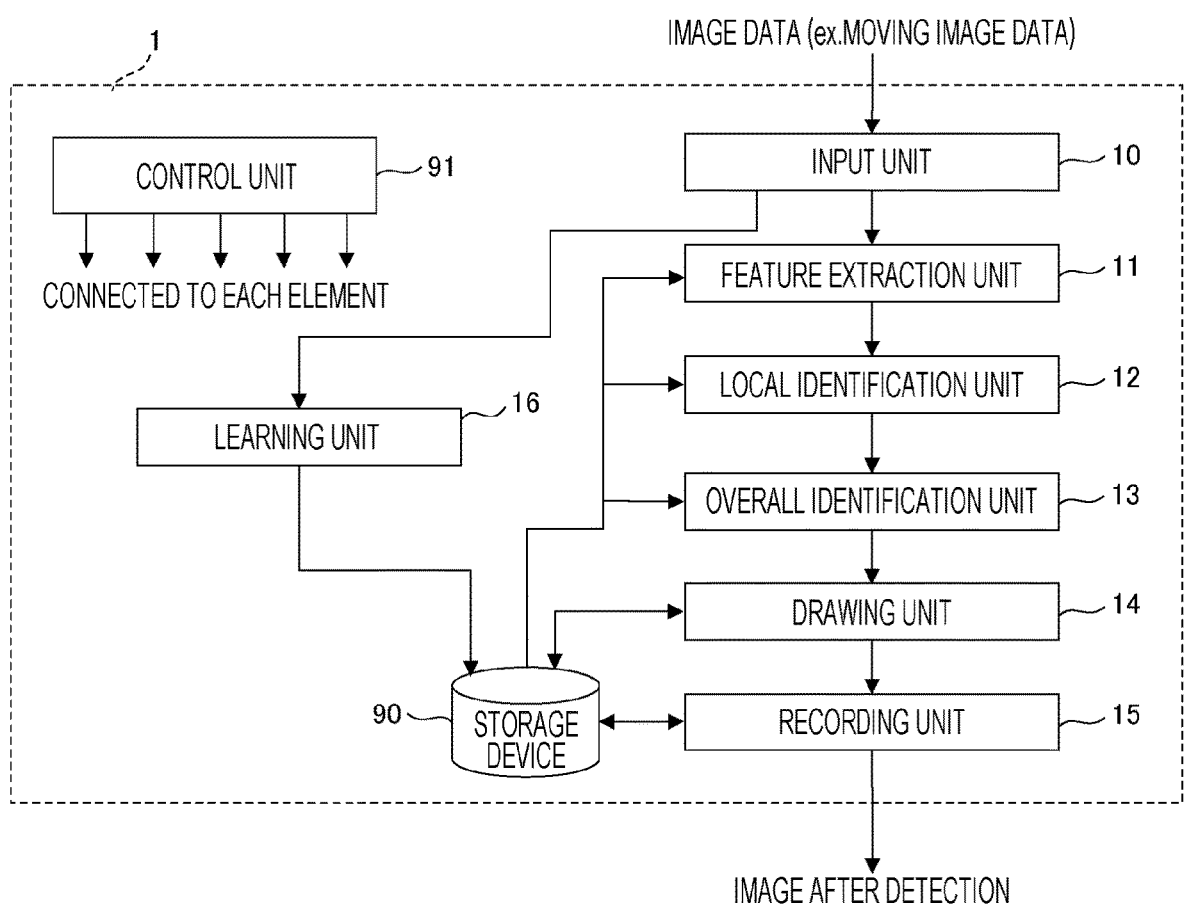
FIG. 1 is a block diagram showing a first embodiment of the present invention and showing functions of an image diagnosis support device.

The embodiment of the present invention provides an image diagnosis support device and a method thereof that realize suppression of detection omission and false detection of an object (for example, a lesion of an abnormal tissue or an abnormal cell) in an image by adding a configuration of calculating a feature amount of the image from the image and further automatically extracting an intended feature of the image, and changing a feature to perform machine learning in the neural network.

Hereinafter, embodiments of the present invention will be described with reference to the attached drawings. In the attached drawings, functionally the same elements may be displayed with the same reference numerals. It should be noted that the attached drawings show specific embodiments and implementation examples according to the principle of the present invention, but these are for understanding of the present invention, and should not be used for restrictively interpreting the present invention in any way.

Although the present embodiment is described in detail enough for those skilled in the art to carry out the present invention, other implementations/forms are also possible, and it is necessary to understand that the configuration and structure can be changed and various elements can be replaced without departing from the scope and spirit of the technical idea of the present invention. Therefore, the following description should not be interpreted as being limited to this.

Further, as will be described later, the embodiment of the present invention may be implemented by software running on a general-purpose computer, or may be implemented by dedicated hardware or a combination of software and hardware.

Hereinafter, each process in the embodiment of the present invention will be described with "each processing unit as a program (for example, feature extraction unit, etc.)" as the subject (a processing entity), but since the program performs the determined processing by being executed by a processor (CPU, etc.) while using a memory and a communication port (communication control device), the explanation may be given with the processor as the subject.

First Embodiment

<Functional Configuration of Image Diagnosis Support Device>

FIG. 1 is a block diagram showing a functional configuration of an image diagnosis support device 1 according to the embodiment of the present invention. The image diagnosis support device 1 includes an input unit 10, a feature extraction unit 11, a local identification unit 12, an overall identification unit 13, a drawing unit 14, a recording unit 15, a learning unit 16, a control unit 91, and a storage device 90.

The image diagnosis support device 1 may be mounted in a tissue and cell image acquisition device such as a virtual slide, or as described later (third to fourth embodiments), may be mounted in a server connected to the tissue and cell image acquisition device via a network.

The input unit 10, the feature extraction unit 11, the local identification unit 12, the overall identification unit 13, the drawing unit 14, the recording unit 15, and the learning unit 16 in the image diagnosis support device 1 may be realized by a program or may be modularized and realized.

Image data is input to the input unit 10. For example, the input unit 10 may acquire encoded still image data or the like, such as JPG, Jpeg2000, PNG, and BMP format, taken at predetermined time intervals by an imaging means such as a camera built into a microscope, and use the image as an input image.

Further, the input unit 10 may extract still image data of frames at predetermined intervals from moving image data such as MotionJPEG, MPEG, H.264, and HD/SDI format, and use the image as an input image. Further, the input unit 10 may use an image acquired by the imaging means via a bus, a network, or the like as an input image. Further, the input unit 10 may use an image already recorded on the removable recording medium as an input image.

The feature extraction unit 11 calculates a feature amount related to an object (for example, a tissue, a cell, etc.) from the input image.

The local identification unit 12 locally calculates an identification value (local identification value) of the object from the extracted feature amount, and classifies whether or not the object is an object to be detected for each local part in the input image. In this embodiment, the local part indicates, for example, a predetermined region, a predetermined organ, an organ, a tissue, a cell, or the like.

The overall identification unit 13 calculates the overall identification result of the input image by using the local identification value calculated by the local identification unit 12.

The drawing unit 14 draws a detection frame on the image so as to surround the object (for example, abnormal tissue, abnormal cell, etc.) classified by the overall identification unit 13.

The recording unit 15 stores in the storage device 90 an image in which the detection frame is drawn on an original image by the drawing unit 14.

The learning unit 16 performs machine learning to calculate respective parameters (filter coefficient, offset value, etc.) required for identification so as to identify an object in the input image as an object, that is, so as to identify a normal tissue or cell as a normal tissue or cell, and so as to identify an abnormal tissue or cell in the input image as an abnormal tissue or cell.

However, when an image showing an arbitrary pattern (hereinafter referred to as a specification pattern) is given together with the input image, the learning unit 16 calculates an additional identification value so as to preferentially identify a place of the specification pattern in the image by using the local identification value calculated by the local identification unit 12 and the specification pattern. In other words, the specification pattern is data indicating a place in the image where the feature is desired to be preferentially extracted.

Machine learning is performed so as to calculate the overall identification result of the input image as the overall identification value by the overall identification unit 13 by using the local identification value and the calculated additional identification value. On the other hand, when there is no specification pattern, machine learning is performed so as to calculate the overall identification result of the input image by the overall identification unit 13 using only the local identification value. Machine learning is performed as described above to calculate each required parameter (filter coefficient, offset value, etc.).

The learning unit 16 performs learning using a neural network (not shown). The neural network may use a service running on an external computer, or may be implemented by hardware.

The control unit 91 is realized by a processor and is connected to each element in the image diagnosis support device 1. The processing of each element of the image diagnosis support device 1 is performed by the autonomous processing of each component described above or by the instruction of the control unit 91.

In this way, the image diagnosis support device 1 of the present embodiment calculates the local identification value for identifying the local part of the input image from the feature amount calculated by the feature extraction unit 11, and further when there is a specification pattern paired with the input image, calculates the additional identification value so as to preferentially identify the place of the specification pattern in the image using the local identification value and the specification pattern. The image diagnosis support device 1 is characterized in that the overall identification result of the input image is calculated using the local identification value or the local identification value and the additional identification value, and the objects in the input image are classified.

<Hardware Configuration of Image Diagnosis Support Device>

Figure 2:
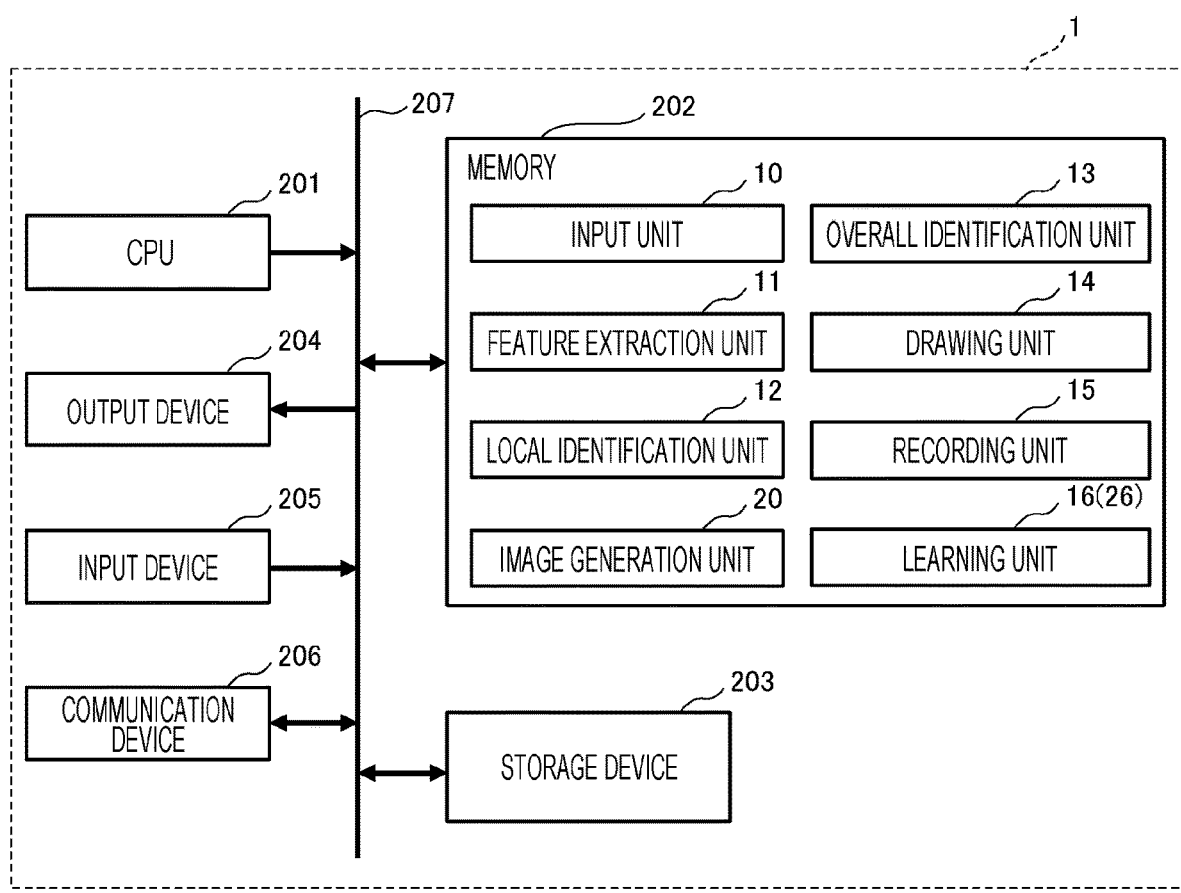
FIG. 2 is a block diagram showing the first embodiment of the present invention and showing an example of a hardware configuration of the image diagnosis support device.

FIG. 2 is a diagram showing a hardware configuration example of the image diagnosis support device 1 according to the embodiment of the present invention.

The image diagnosis support device 1 includes a CPU (processor) 201 that executes various programs, a memory 202 that stores various programs, a storage device (corresponding to the storage device 90) 203 that stores various pieces of data, an output device 204 for outputting an image after detection, an input device 205 for inputting instructions by a user and images, and a communication device 206 for communicating with other devices, and these are connected to each other by a bus 207.

The CPU 201 reads various programs from the memory 202 and executes them as needed.

The memory 202 stores the input unit 10, the feature extraction unit 11, the local identification unit 12, the overall identification unit 13, the drawing unit 14, the recording unit 15, and the learning unit 16 as programs. However, an image generation unit 20 is not included in the memory 202 of the image diagnosis support device 1 of the first embodiment.

The storage device 203 stores a processing target image, a local identification value for an input image generated by the local identification unit 12, a classification result and its numerical value for an input image generated by the overall identification unit 13, position information for drawing a detection frame generated by the drawing unit 14, respective parameters of later-described Equation 1, Equation 2, and Equation 5 generated by the learning unit 16, and the like.

The output device 204 is composed of devices such as a display, a printer, and a speaker. For example, the output device 204 displays data generated by the drawing unit 14 on a display screen.

The input device 205 is composed of devices such as a keyboard, a mouse, and a microphone. An instruction by a user (including determination of a processing target image) is input to the image diagnosis support device 1 by the input device 205.

The communication device 206 is not an essential configuration for the image diagnosis support device 1, and when a personal computer or the like connected to an image acquisition device includes a communication device, the image diagnosis support device 1 does not need to hold the communication device 206. The communication device 206 receives, for example, data (including an image) transmitted from another device (for example, a server) connected via a network, and stores the data in the storage device 203.

The image diagnosis support device 1 of the present invention calculates the feature amount of each object (tissue, cell, etc.) related to the input image, calculates the local identification value for identifying the local part of the input image from the calculated feature amount, and further, when there is a specification pattern paired with the input image, calculates the additional identification value so as to preferentially identify a place of the specification pattern in the image using the local identification value and the specification pattern, calculates the overall identification result of the input image using the local identification value or the local identification value and the additional identification value, and determines each object (tissue, cell lesion-likeness, etc.) in the input image.

<Configuration and Processing of Each Part>

Hereinafter, the configuration and processing of each element will be described in detail.

(i) Feature Extraction Unit 11

Figure 3:
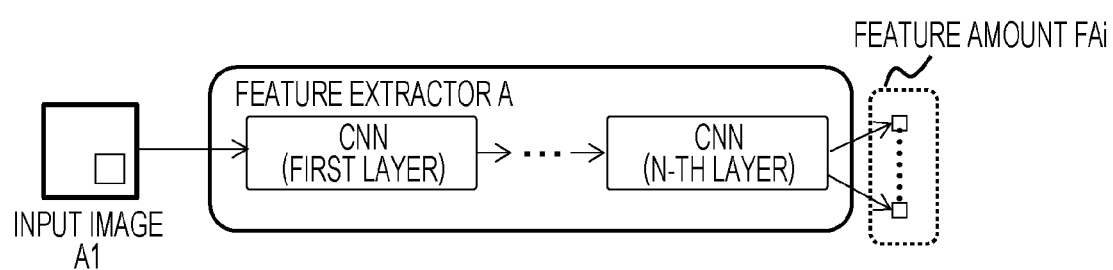
FIG. 3 is a diagram showing the first embodiment of the present invention and explaining an example of processing of a feature extraction unit.

The feature extraction unit 11 calculates the feature amount of the input image. As an example, FIG. 3 shows an example of calculating each feature amount. CNN in FIG. 3 represents a Convolutional Neural Network.

For example, using a feature extractor A, a feature amount $FA_i$ of an object (for example, tissue, cell, etc.) of an input image A1 is calculated from the input image A1 by the following Equation 1. A filter coefficient $w_j$ shown in Equation 1 is a coefficient calculated by machine learning or the like so as to identify each object as each object (a normal tissue or a normal cell as a normal tissue or a normal cell, or an abnormal tissue or an abnormal cell as an abnormal tissue or an abnormal cell, etc.). In Equation 1, $p_j$ is a pixel value, $b_i$ is an offset value, $m$ is a number of filter coefficients, and $h$ is a nonlinear function.

Figure 4:
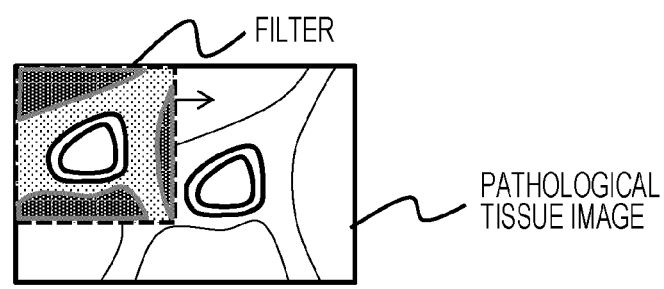
FIG. 4 is a diagram showing the first embodiment of the present invention and explaining an example of processing of the feature extraction unit.

As shown in FIG. 4, a feature amount $f_i$ of a filter $i$ is calculated by calculating the calculation result of each filter from the upper left to the lower right of a target image using Equation 1. For example, a matrix of the feature amount $f_i$ calculated by the feature extractor A is used as the feature amount $FA_i$ of the input image A1. The method of generating the feature extractor A will be described in the learning unit 16 described later.

[Math. 1]

$$fi = h\left(\sum_{j=1}^{m}(pj \times wj) + bi\right)$$ (Expression 1)

(ii) Local Identification Unit 12

Figure 5:
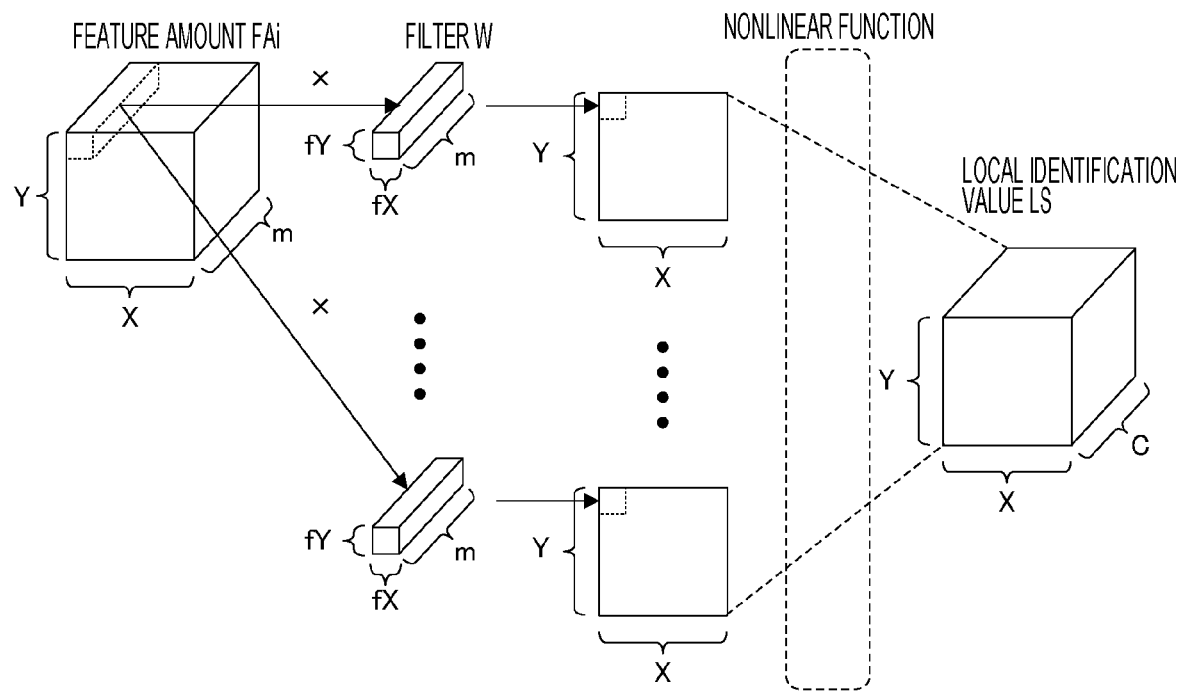
FIG. 5 is a diagram showing the first embodiment of the present invention and explaining an example of processing of a local identification unit.

As shown in FIG. 5, the local identification unit 12 uses the feature amount FAi of the feature extractor A calculated by the feature extraction unit 11 and a nonlinear function (for example, a sigmoid function, etc.) to calculate a value of an object-likeness (for example, lesion-likeness, etc.) for each local region by Equation 2, and determines whether or not the object in the input image A1 is an object to be detected (for example, normal cell or abnormal cell, etc.).

In Equation 2 below, LS is a local identification value composed of a three-dimensional array of class, height, and width, FAi is a feature amount composed of a three-dimensional array of number of the feature amount, height, and width calculated by the feature extraction unit 11, W is a filter for calculating a local identification value composed of a four-dimensional array of class, number of the feature amount, height, and width, B is an offset value for calculating a local identification value composed of a one-dimensional array of class, c Is an index of class, y is a vertical index of the feature amount, x is a horizontal index of the feature amount, fy is a vertical index of the filter, fx is a horizontal index of the filter, and j is an index of the filter.

In Equation 2, the local identification value LS is calculated using a Convolution process, but the calculation method of the local identification value LS is not limited to this. For example, the calculation may be performed by applying a Convolution process or a nonlinear function multiple times, or the feature amount at each coordinate may be input to other identification methods such as Random forest or SVM to calculate the local identification value LS.

[Math. 2]

$$LS(c, y, x) = \text{sigmoid}\left(\sum_{j=0}^{m}\sum_{fy=0}^{fY}\sum_{fx=0}^{fX} FAi(j, y+fy, x+fx) \times W(c, j, fy, fx) + B(c)\right)$$ (Expression 2)

(iii) Overall Identification Unit 13

Figure 6:
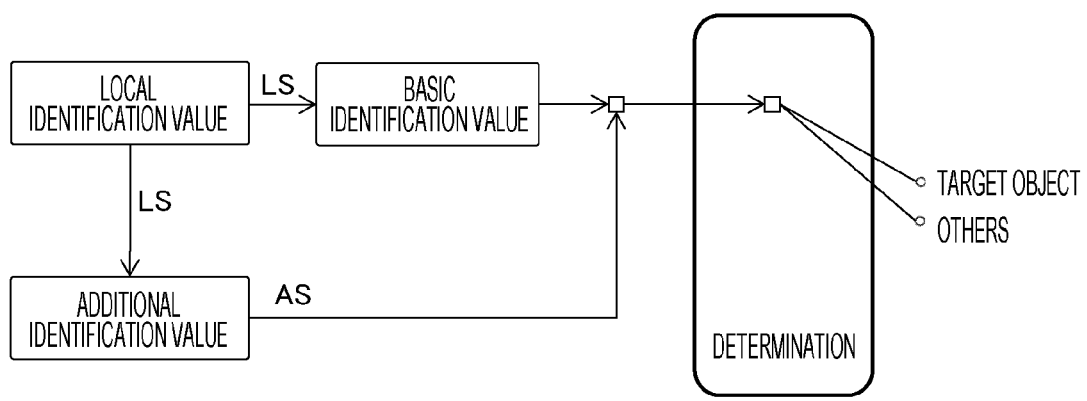
FIG. 6 is a diagram showing the first embodiment of the present invention and explaining an example of processing of an overall identification unit.

As shown in FIG. 6, the overall identification unit 13 uses the local identification value LS calculated by the local identification unit 12 or the local identification value LS, the additional identification value AS described later, and a nonlinear function (for example, a sigmoid function) to calculate a calculation result R that indicates a value of the object-likeness (for example, lesion-likeness) of each object in the input image, by using Equation 3 below if there is a specification pattern, or Equation 4 below if there is no specification pattern. Then, the overall identification unit 13 determines whether or not the object in the input image A1 is an object to be detected (for example, normal cell, abnormal cell, or the like).

However, a basic identification value BS shown in Equation 3 and Equation 4 below is calculated using a global identification value GS of Equation 5 and Equation 6 below.

In Equation 5, GS is a global identification value composed of a one-dimensional array of class, FAi is a feature amount composed of a three-dimensional array of number of the feature amount, height, and width calculated by the feature extraction unit 11, W is a filter for calculating the global identification value composed of a four-dimensional array of class, number of the feature amount, height, and width, B is an offset value for calculating the global identification value composed of a one-dimensional array of class, c is an index of class, y is a vertical index of the feature amount, x is a horizontal index of the feature amount, fy is a vertical index of the filter, fx is a horizontal index of the filter, and j is an index of the filter.

In addition, Label of Equation 6 indicates a teacher label for each image composed of a one-dimensional array of class. The learning unit 16 described later calculates a filter W coefficient and an offset value B of Equation 5 by machine learning.

In Equation 5, the global identification value GS is calculated using a Convolution process and a horizontal and vertical average process, but the calculation method of the global identification value GS is not limited to this. For example, after applying a Convolution process or a nonlinear function multiple times, a horizontal and vertical average process may be performed, or horizontal and vertical average values of values obtained by inputting a feature amount at each coordinate to other identification methods such as Random forest and SVM may be calculated. Further, the sum process or the like may be used as well as the average process in the horizontal and vertical directions.

Further, each term of Equation 3 may be multiplied by a weight calculated according to the frequency of appearance, the values of the additional identification value AS and the basic identification value BS, or the like.

[Math. 3]

$$R = AS + BS$$ (Expression 3)

[Math. 4]

$$R = BS$$ (Expression 4)

[Math. 5]

$$GS(c) = \text{sigmoid}\left(\frac{1}{X*Y}\sum_{y=0}^{Y}\sum_{x=0}^{X}\sum_{j=0}^{m}\sum_{fy=0}^{fY}\sum_{fx=0}^{fX} FAi(j, y+fy, x+fx) \times W(c, j, fy, fx) + B(c)\right)$$ (Expression 5)

[Math. 6]

$$BS = \frac{1}{C}\sum_{c=0}^{C} NLL(GS(c), \text{Label}(c))$$ (Expression 6)

However, in Equation 6, NLL shows a loss function, for example, Negative log likelihood.

As an example, even if it is not possible to determine the presence or absence of an object (for example, a cell lesion, etc.) in the image, by using the feature extractor A that reflects the additional identification value in the learning unit 16 described later, the local identification value, the global identification value, and the additional identification value described later, the features of the object (for example, the presence or absence of basal cells and the presence or absence of lesions in epithelial cells) that could not be extracted by conventional machine learning techniques are clarified, and it becomes possible to accurately determine each object in the image.

(iv) Learning Unit 16

The learning unit 16 includes the feature extraction unit 11, the local identification unit 12, and the overall identification unit 13 described above, and an additional identification unit 17, which will be described later. The additional identification unit 17 calculates the additional identification value AS so as to preferentially identify the place of the specification pattern in the image by using the local identification value LS and the specification pattern.

When the specification pattern and the input image are given as a pair, the additional identification unit 17 uses the local identification value LS calculated by the local identification unit 12 and the specification pattern (Pattern) to calculate the additional identification value AS by Equation 7.

[Math. 7]

$$AS = \frac{1}{C*Y*X}\sum_{c=0}^{C}\sum_{y=0}^{Y}\sum_{x=0}^{X} NLL(LS(c, y, x), \text{Pattern}(c, y, x)) \quad \text{(Expression 7)}$$

In Equation 7, Pattern is a three-dimensional array of class, height, and width, and the target identification value of the local classifier is specified by 0 or 1.

If there is a specification pattern, the learning unit 16 calculates the additional identification value AS by using the local identification value LS and the specification pattern.

Then, the overall identification unit 13 uses the machine learning technique which is the conventional technique to learn a feature amount of each object so as to identify each object in the input image as each object (for example, normal tissue or normal cell as normal tissue or normal cell, and abnormal tissue or abnormal cell as abnormal tissue or abnormal cell) using the local identification value LS and the additional identification value AS, and calculates the filter W coefficient and the offset value B.

For example, a Convolutional Neural Network may be used as a machine learning technique. On the other hand, when there is no specification pattern, the overall identification unit 13 learns the feature amount of each object so as to identify each object in the input image as each object by using only the local identification value LS, and calculates the filter W coefficient and the offset value B.

Figure 7:
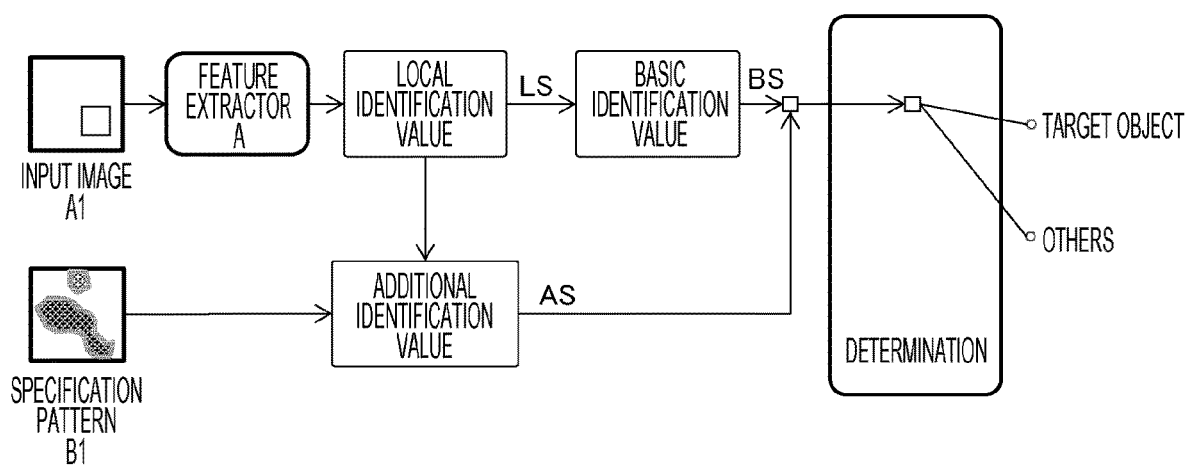
FIG. 7 is a diagram showing the first embodiment of the present invention and explaining an example of processing of a learning unit.

As shown in FIG. 7, the learning unit 16 calculates the feature amount fi (referred to as FAi) of the input image A1 by Equation 1 using the input image A1 (for example, a pathological image) by prior machine learning.

Next, the learning unit 16 calculates the local identification value LS from the feature amount fi by Equation 2, and calculates the additional identification value AS using the local identification value LS and the specification pattern B1 by Equation 7.

Furthermore, the learning unit 16 uses the basic identification value BS and the additional identification value AS calculated from the local identification value LS to calculate respective parameters from Equation 1 to Equation 7 so as to determine each target object as each target object (for example, an abnormal tissue or an abnormal cell as an abnormal tissue or an abnormal cell, a normal tissue or a normal cell as a normal tissue or a normal cell).

In this way, by generating the feature extractor A that reflects the additional identification value AS by the specification pattern and the classifier C that includes the overall identification unit 13, it becomes possible to calculate the feature amount for preferentially identifying the place indicated by the specification pattern.

The learning unit 16 repeatedly performs the processes of the feature extraction unit 11, the local identification unit 12, the overall identification unit 13, and the additional identification unit 17 using a plurality of learning images to calculate respective parameters (filter coefficient wj, filter W coefficient, offset values bi and B, etc.) shown in Equation 1, Equation 2, and Equation 5. Then, the learning unit 16 generates the classifier C including a feature extractor A that calculates the feature amount FAi of the input image A1 from the input image A1, a local classifier L that calculates the local identification value, and a global classifier M that calculates the global identification value.

Further, the learning unit 16 stores the respective calculated parameters (filter coefficient wj, filter W coefficient, offset values bi and B, etc.) in the storage device 90.

(v) Drawing Unit 14

Figure 8:
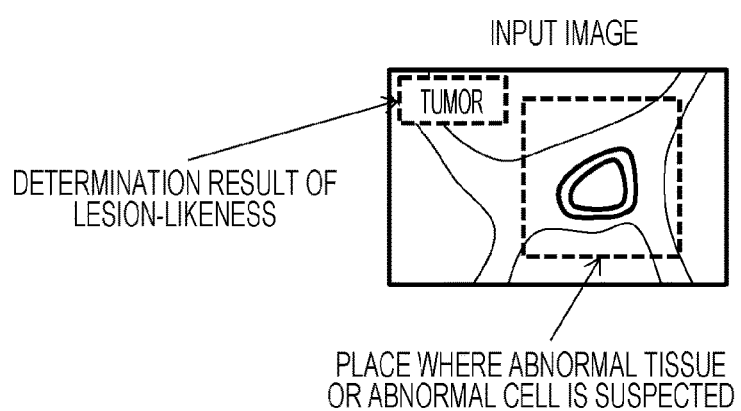
FIG. 8 is a diagram showing the first embodiment of the present invention and explaining an example of processing of a drawing unit.

When the overall identification unit 13 determines the object in the image as a predetermined object (for example, abnormal tissue or abnormal cell), the drawing unit 14, as shown in FIG. 8, draws a detection frame in the input target image and outputs it to the output device 204 in order to indicate a place (for example, a place where an abnormal tissue or an abnormal cell is suspected) of an object to be detected.

On the other hand, when it is determined as a normal tissue or a normal cell, the drawing unit 14 does not draw a detection frame on the input target image and displays the input target image as it is. In addition, as shown in FIG. 8, the result of the determined lesion-likeness (for example, tumor) is displayed.

Figure 11:
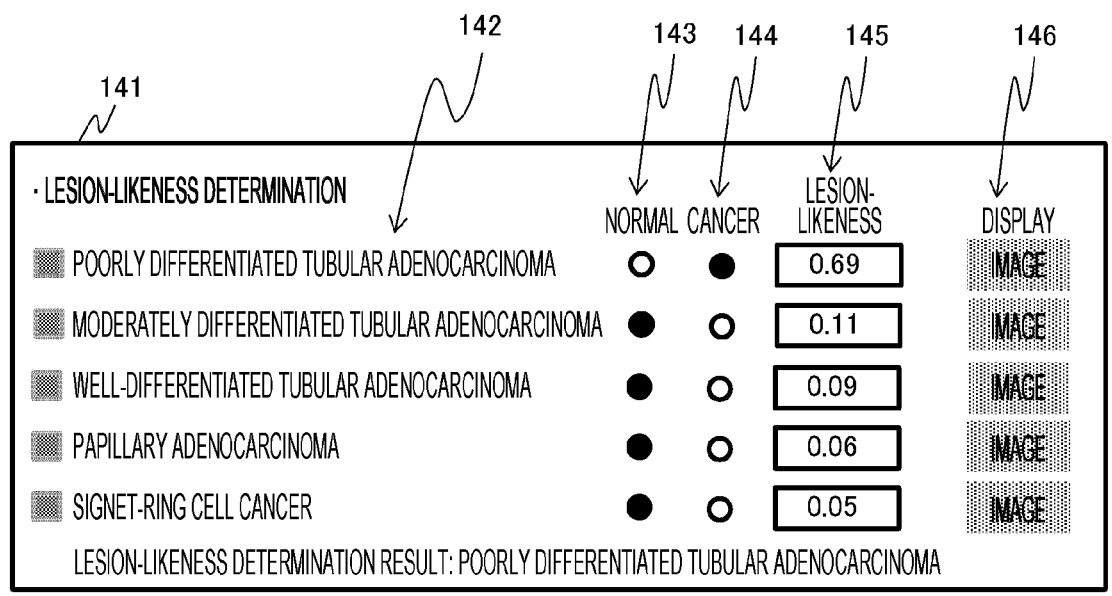
FIG. 11 is a diagram showing the first embodiment of the present invention and explaining an example of a determination result display screen of the drawing unit.

Further, as an example, the drawing unit 14 displays the result of the lesion-likeness determination on the GUI (graphical user interface) shown in FIG. 11. FIG. 11 is an example of gastric cancer, and shows the classification results of poorly differentiated tubular adenocarcinoma, moderately differentiated tubular adenocarcinoma, well-differentiated tubular adenocarcinoma, papillary adenocarcinoma, and signet-ring cell cancer.

The determination result display screen 141 of FIG. 11 is composed of a lesion name 142, a determination result (normal 143, cancer 144), a lesion-likeness value 145, and a display button 146.

In the example of FIG. 11, for the poorly differentiated tubular adenocarcinoma, the overall identification unit 13 classifies that the input target image includes poorly differentiated tubular adenocarcinoma which is an abnormal tissue or cell, and calculates that the lesion-likeness value 145 of the poorly differentiated tubular adenocarcinoma is 0.69.

In addition, for the moderately differentiated tubular adenocarcinoma, this is an example in which the overall identification unit 13 classifies that the input target image does not include moderately differentiated tubular adenocarcinoma which is an abnormal tissue or cell, and includes a normal tissue or cell, and calculates that the lesion-likeness value 145 of the moderately differentiated tubular adenocarcinoma is 0.11.

In addition, for the well-differentiated tubular adenocarcinoma, this is an example in which the overall identification unit 13 classifies that the input target image does not include well-differentiated tubular adenocarcinoma which is an abnormal tissue or cell, and includes a normal tissue or cell, and calculates that the lesion-likeness value 145 of the well-differentiated tubular adenocarcinoma is 0.09.

In addition, for the papillary adenocarcinoma, this is an example in which the overall identification unit 13 classifies that the input target image does not include papillary adenocarcinoma which is an abnormal tissue or cell, and includes a normal tissue or cell, and calculates that the lesion-likeness value 145 of the papillary adenocarcinoma is 0.06. In addition, for the signet-ring cell cancer, this is an example in which the overall identification unit 13 classifies that the input target image does not include signet-ring cell cancer which is an abnormal tissue or cell, and includes a normal tissue or cell, and calculates that the lesion-likeness value 145 of the signet-ring cell cancer is 0.05.

(vi) Recording Unit 15

The recording unit 15 stores the coordinate information for drawing the detection frame on the target image input by the drawing unit 14 and the target image in the storage device 90.

<Processing Procedure of Image Diagnosis Support Device>

Figure 9:
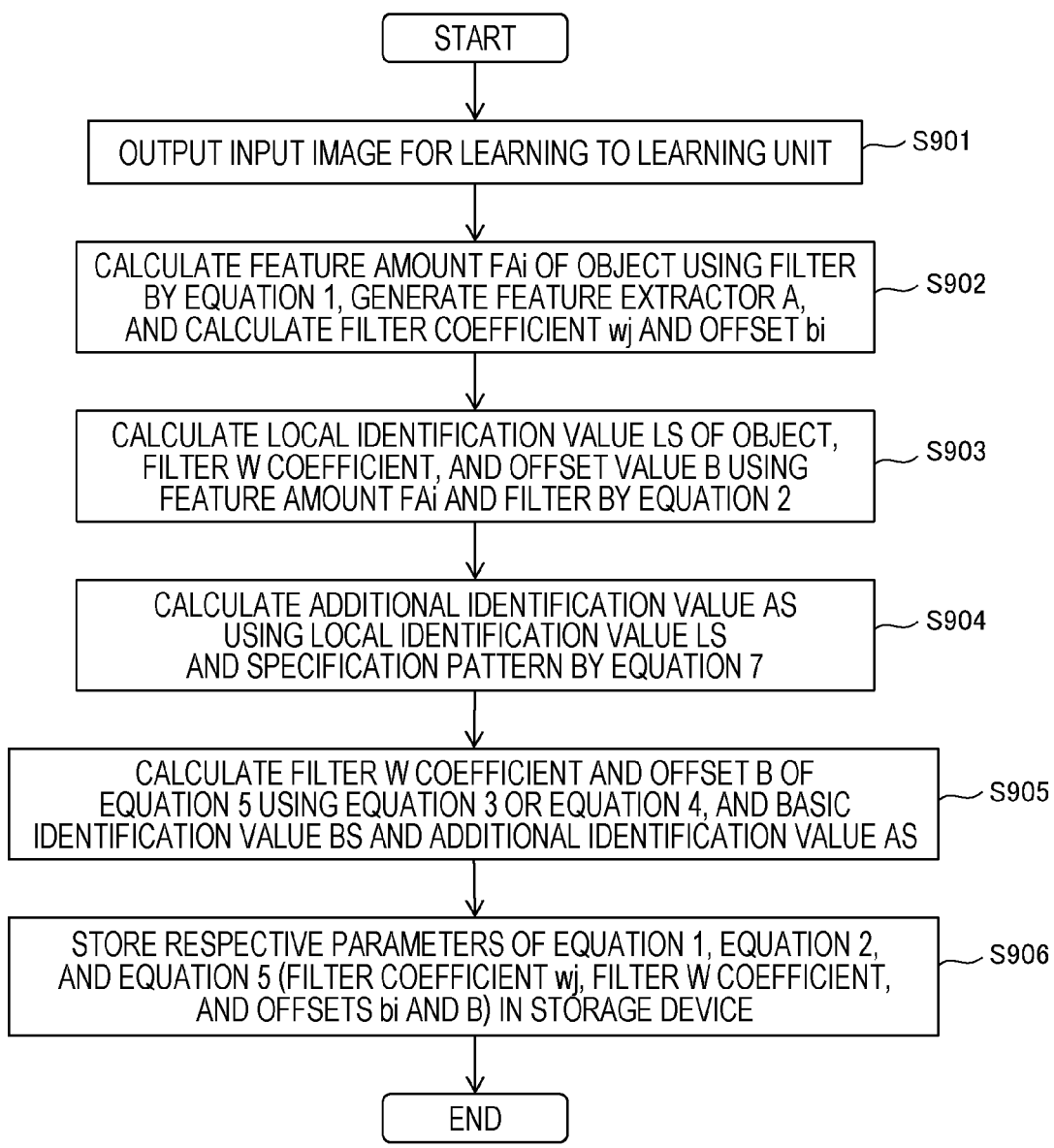
FIG. 9 is a flowchart showing the first embodiment of the present invention and explaining an example of processing performed in the learning unit.

FIG. 9 is a flowchart for explaining an example of the processing performed by the learning unit 16 of the image diagnosis support device 1 according to the first embodiment of the present invention. In the following, the learning unit 16 is described as a processing entity, but the CPU 201 may be read as the processing entity and the CPU 201 may execute each processing unit as a program.

(i) Step S901

The input unit 10 receives an image input for learning and outputs the input image to the learning unit 16.

(ii) Step S902

The learning unit 16 calculates the feature amount FAi of an object (for example, tissue, cell, etc.) of the input image A1 using the filter by Equation 1 described above by machine learning, and generates the feature extractor A. The learning unit 16 calculates the filter coefficient wj and the offset value bi for the feature amount FAi.

(iii) Step S903

The learning unit 16 calculates the local identification value LS from the feature amount FAi by Equation 2 described above by machine learning, calculates the value of object-likeness (for example, lesion-likeness, etc.) for each local region, and calculates respective parameters of Equation 2 (filter W coefficient, offset value B, etc.) for calculating the local identification value LS so as to determine whether or not the object in the input image A1 is an object to be detected (for example, normal cell, or abnormal cell, etc.).

(iv) Step S904

The learning unit 16 uses the local identification value LS and the specification pattern (Pattern) B1 to calculate the additional identification value AS so as to preferentially capture the features of a region in the image indicated by the specification pattern B1 by Equation 7 described above by machine learning.

(v) Step S905

By machine learning, the learning unit 16 uses the basic identification value BS and the additional identification value AS calculated from the local identification value LS by Equation 3 or Equation 4 described above to calculate respective parameters (filter W coefficient, offset value B, etc.) of Equation 5 so as to determine each target object as a predetermined target object (for example, an abnormal tissue or an abnormal cell as an abnormal tissue or an abnormal cell, a normal tissue or a normal cell as a normal tissue or a normal cell). Then, the learning unit 16 calculates the calculation result R indicating the value of the object-likeness (for example, lesion-likeness, etc.) of each object in the input image by Equation 3 or Equation 4 described above.

(vi) Step S906

The learning unit 16 stores respective parameters of Equation 1, Equation 2 and Equation 5 (filter coefficient wj, filter W coefficient, offset values bi and B, etc.) in the storage device 90.

By the processing of the above steps S901 to S906, the feature extractor A reflecting the additional identification value AS by the specification pattern B1 and the classifier C including the overall identification unit 13 are generated, and the feature amount for preferentially identifying the place indicated by the specification pattern B1 can be calculated.

Figure 10:
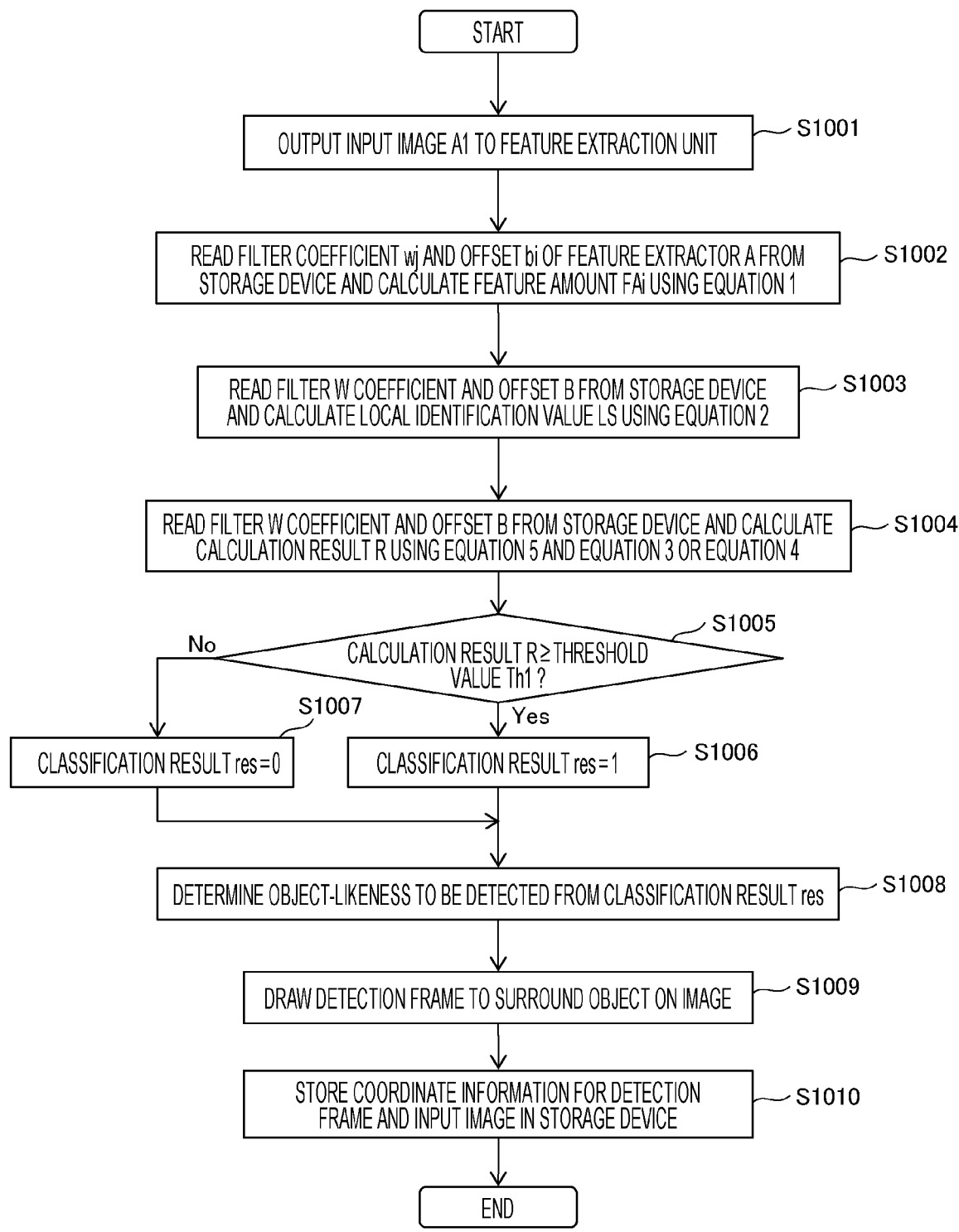
FIG. 10 is a flowchart showing the first embodiment of the present invention and explaining an example of processing performed in the image diagnosis support device.

FIG. 10 is a flowchart for explaining the processing of the image diagnosis support device 1 according to the first embodiment of the present invention. In the following, each processing unit (input unit 10, feature extraction unit 11, etc.) is described as a processing entity, but the CPU 201 may be read as the processing entity and the CPU 201 may execute each processing unit as a program.

(i) Step S1001

The input unit 10 outputs the input image A1 to the feature extraction unit 11.

(ii) Step S1002 The feature extraction unit 11 reads the filter coefficient wj and the offset bi of the feature extractor A from the storage device 90, and calculates a feature amount FAi of an object (for example, a tissue, a cell, etc.) in the image of the input image A1 using the filter by Equation 1 described above.

(iii) Step S1003

The local identification unit 12 reads the coefficient of the filter coefficient W and the offset B from the storage device 90, and calculates the local identification value LS from the feature amount FAi by Equation 2.

(iv) Step S1004

The overall identification unit 13 reads the coefficient of the filter coefficient W and the offset B from the storage device 90, and calculates the calculation result R by Equation 5 and Equation 3 or Equation 4.

(v) Step S1005

The overall identification unit 13 compares the calculated calculation result R with a threshold value Th1. That is, when the calculation result R≥the threshold value Th1, the process proceeds to step S1006. On the other hand, when the calculation result R<the threshold value Th1, the process proceeds to step S1007.

(vi) Step S1006

The overall identification unit 13 determines that the object in the input image is a target object to be detected (for example, abnormal tissue, abnormal cell, etc.), and sets, for example, "1" to the classification result res.

(vii) Step S1007

The overall identification unit 13 determines that the object in the input image is not an object to be detected (for example, normal tissue, normal cell, etc.), and sets, for example, "0" to the classification result res.

(viii) Step S1008 The overall identification unit 13 classifies the lesion-likeness from the classification result res. For example, for the prostate, the result of non-tumor, tumor, or the like is set to the classification result res. Therefore, by using respective parameters calculated by reflecting the additional identification value during machine learning, it becomes possible to accurately calculate the presence or absence of lesion (for example, tumor, etc.) and lesion-likeness (R=0.69: range (0 to 1)) by the classification result res.

(ix) Step S1009

When it is classified as an object to be detected (for example, abnormal tissue, abnormal cell, etc.), as shown in FIG. 8, the drawing unit 14 draws a detection frame indicating the abnormal tissue or abnormal cell on the image and displays it on the output device 204.

When it is classified as an object not to be detected (for example, normal tissue, normal cell, etc.), the drawing unit 14 does not draw the detection frame on the image. Further, as shown in FIG. 11, the drawing unit 14 displays the value of the object-likeness (for example, lesion-likeness) to be detected calculated from the input image.

(x) Step S1010

The recording unit 15 stores the coordinate information for drawing the detection frame on the target image input by the drawing unit 14 and the target image in the storage device 90 (corresponding to the storage device 203).

As described above, according to the first embodiment, the image diagnosis support device 1 performs machine learning on the feature amount of the image so as to preferentially capture the feature of the region in the image shown by the specification pattern B1, and calculates respective parameters (filter coefficient, offset, etc.). Then, since the image diagnosis support device 1 generates a classifier that classifies whether or not it is an object to be detected (for example, abnormal tissue or cell), it becomes possible to classify whether or not it is an object to be detected (abnormal tissue, abnormal cell, etc.) from the image while suppressing false detection or over-detection of each object (for example, lesion).

In addition, even if the number of learning images is small and the intended feature amount of the object in the image cannot be captured by machine learning, since the classifier is generated by machine learning so as to preferentially capture the intended feature amount in the image by the neural network by using the specification pattern B1, it becomes possible to accurately determine an object or object-likeness (for example, lesion-likeness) in the image even if the number of learning images is small.

In addition, even if the number of learning images increases, since the intended feature amount in the image is preferentially captured while suppressing the extraction of the unintended feature amount of the image during machine learning, it becomes possible to accurately determine an object or object-likeness (for example, lesion-likeness) in the image.

Second Embodiment

Figure 12:
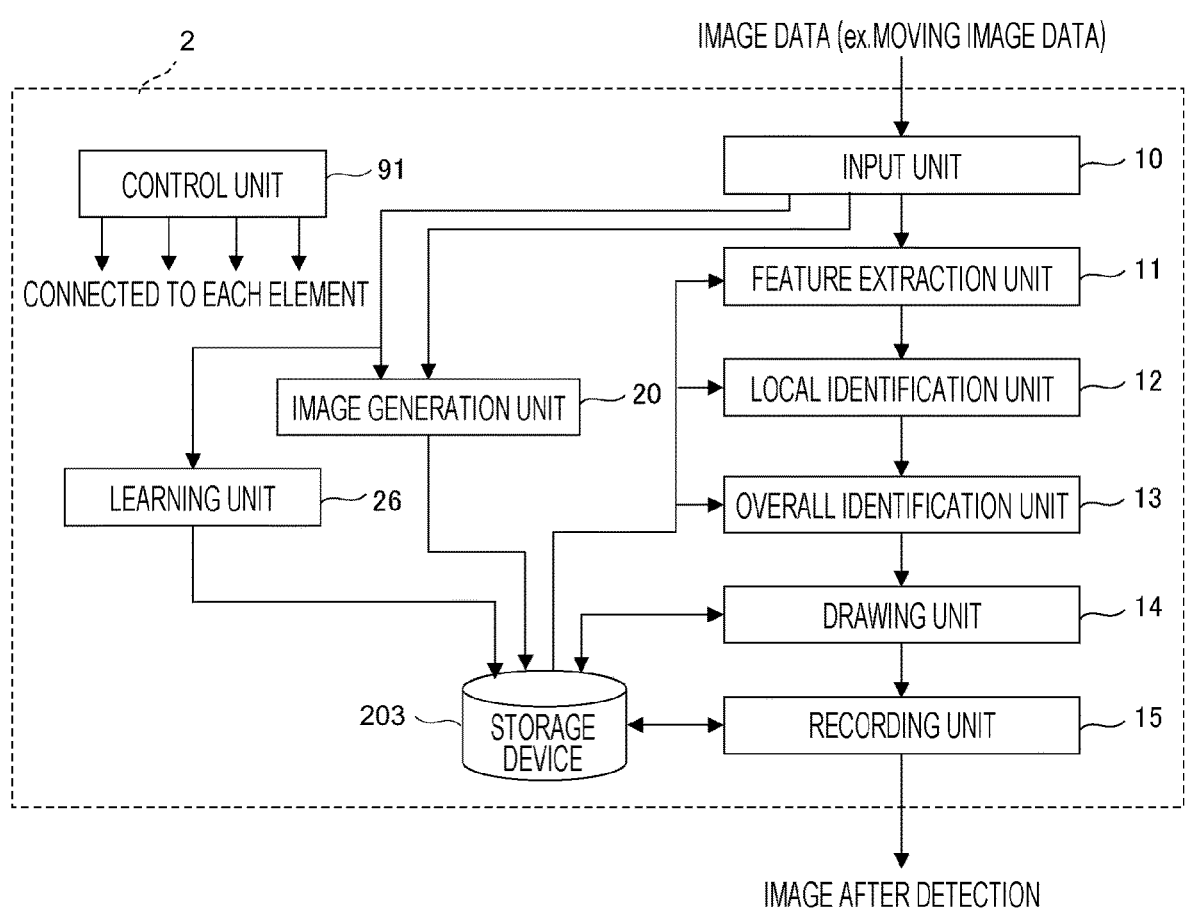
FIG. 12 is a block diagram showing a second embodiment of the present invention and showing functions of an image diagnosis support device.

An image diagnosis support device 2 according to a second embodiment shown in FIG. 12 includes many of the same configurations as those in FIG. 1 of the first embodiment, but unlike the first embodiment, includes an image generation unit 20. Further, in this second embodiment, a learning unit 26 is adopted instead of the learning unit 16 of the first embodiment. Therefore, here, a configuration different from that of FIG. 1 will be described.

The image diagnosis support device 2 according to the second embodiment of the present invention generates an image of a specification pattern by prior machine learning, and uses the generated image of the specification pattern to perform machine learning in the learning unit 26 as in the first embodiment. The learning unit 26 calculates a feature amount of an object (for example, tissue, cell, etc.) in the image reflecting an additional identification value, and uses the feature amount to determine a predetermined object-likeness (for example, lesion-likeness) of an object (for example, tissue, cell, etc.) in the input image.

<Configuration and processing of each part>

Hereinafter, the configuration and processing of each element different from FIG. 1 will be described in detail.

(i) Image Generation Unit 20

Figure 13A:
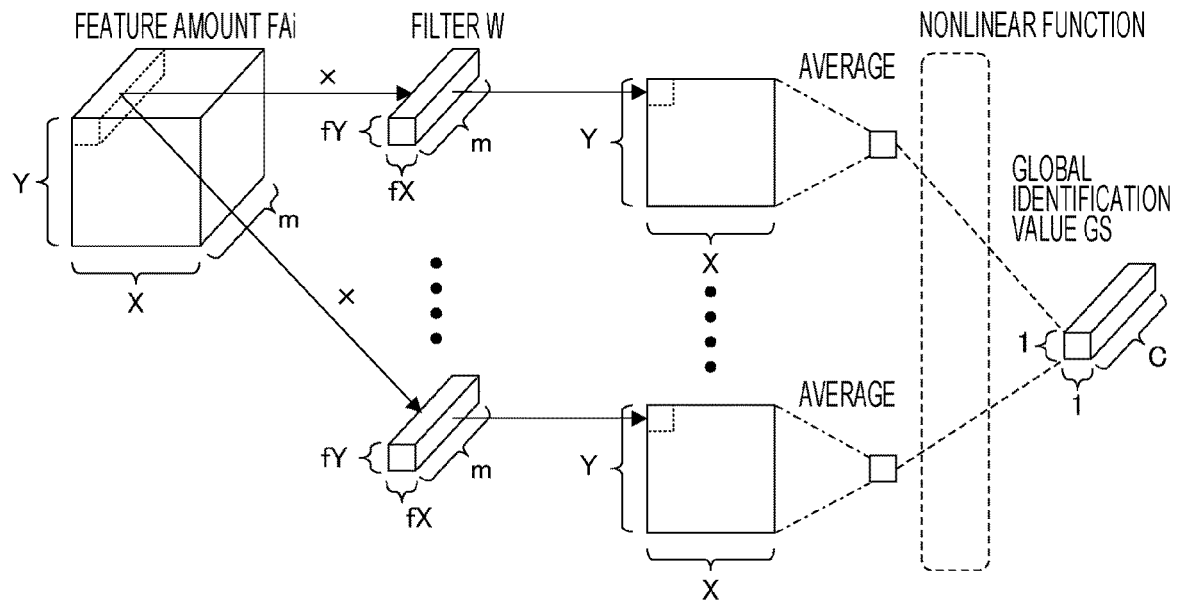
FIG. 13A is a diagram showing the second embodiment of the present invention and explaining an example of calculating a global identification value from a feature amount.
Figure 13B:
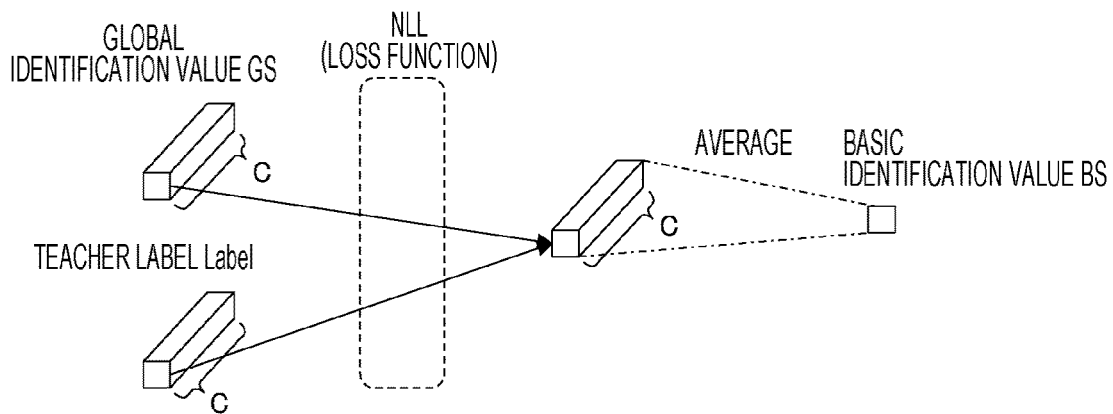
FIG. 13B is a diagram showing the second embodiment of the present invention and explaining an example of calculating a basic identification value from a global identification value and a teacher label.

The image generation unit 20 generates, as a specification pattern, a pattern composed of the local identification value shown in FIG. 5 calculated in a process of calculating the basic identification value BS shown in FIGS. 13A and 13B by performing machine learning in advance using a plurality of learning images P1 including an object whose feature amount is desired to be captured with particular emphasis.

Figure 13C:
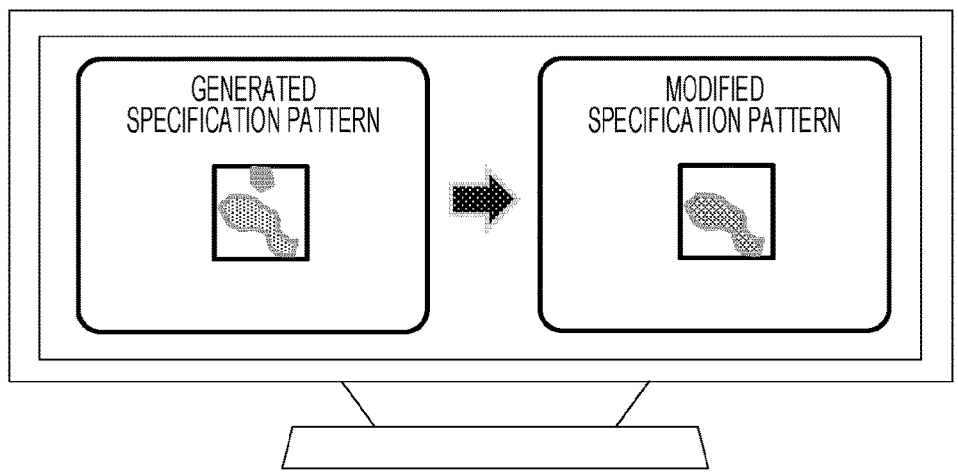
FIG. 13C is a diagram showing the second embodiment of the present invention and showing an example of a GUI for modifying a generated specification pattern.

FIG. 13A is a diagram illustrating an example of calculating the global identification value GS from the feature amount FAi. FIG. 13B is a diagram illustrating an example of calculating the basic identification value BS from the global identification value GS and the teacher label Label. FIG. 13C is a diagram showing an example of a GUI that modifies the generated specification pattern.

Although the average of the feature amounts is used in FIGS. 13A and 13B, another calculation process such as the sum total may be performed. The image generation unit 20 stores the generated specification pattern in the storage device 90. When the specification pattern is used for machine learning, it may be used as it is, or as shown in FIG. 13C, a modified specification pattern in which a part of the generated specification pattern is modified by GUI etc. may be used.

(ii) Learning unit 26

The learning unit 26 performs machine learning in the same manner as the learning unit 16 of the first embodiment by using the specification pattern generated by the image generation unit 20 and a learning image P2 including the learning image P1 to generate the classifier C. Further, the learning unit 26 calculates respective parameters (filter coefficient wj, filter W coefficient, offset values bi and B, etc.) shown in Equation 1, Equation 2 and Equation 5 shown in the first embodiment, and stores the parameters in the storage device 90.

Using the generated classifier C and respective parameters, as in the first embodiment, the learning unit 26 inputs the input image A1 to calculate the feature amount FAi and the basic identification value BS, determines whether or not the object in the input image A1 is an object to be detected (for example, abnormal tissue or abnormal cell), and also further determines an object-likeness (for example, lesion-likeness).

<Hardware Configuration of Image Diagnosis Support Device>

The hardware configuration example of the image diagnosis support device 2 according to the second embodiment of the present invention has the same configuration as that of FIG. 2 of the first embodiment, but unlike the image diagnosis support device 1, the image generation unit 20 is included in the memory 202.

The storage device 90 of the image diagnosis support device 1 stores an image to be processed, a classification result and its numerical value related to the input image generated by the overall identification unit 13, an image of the specification pattern generated by the image generation unit 20, position information for drawing the detection frame generated by the drawing unit 14, respective parameters of Equation 1, Equation 2 and Equation 5 generated by the learning unit 26, and the like.

Figure 14:
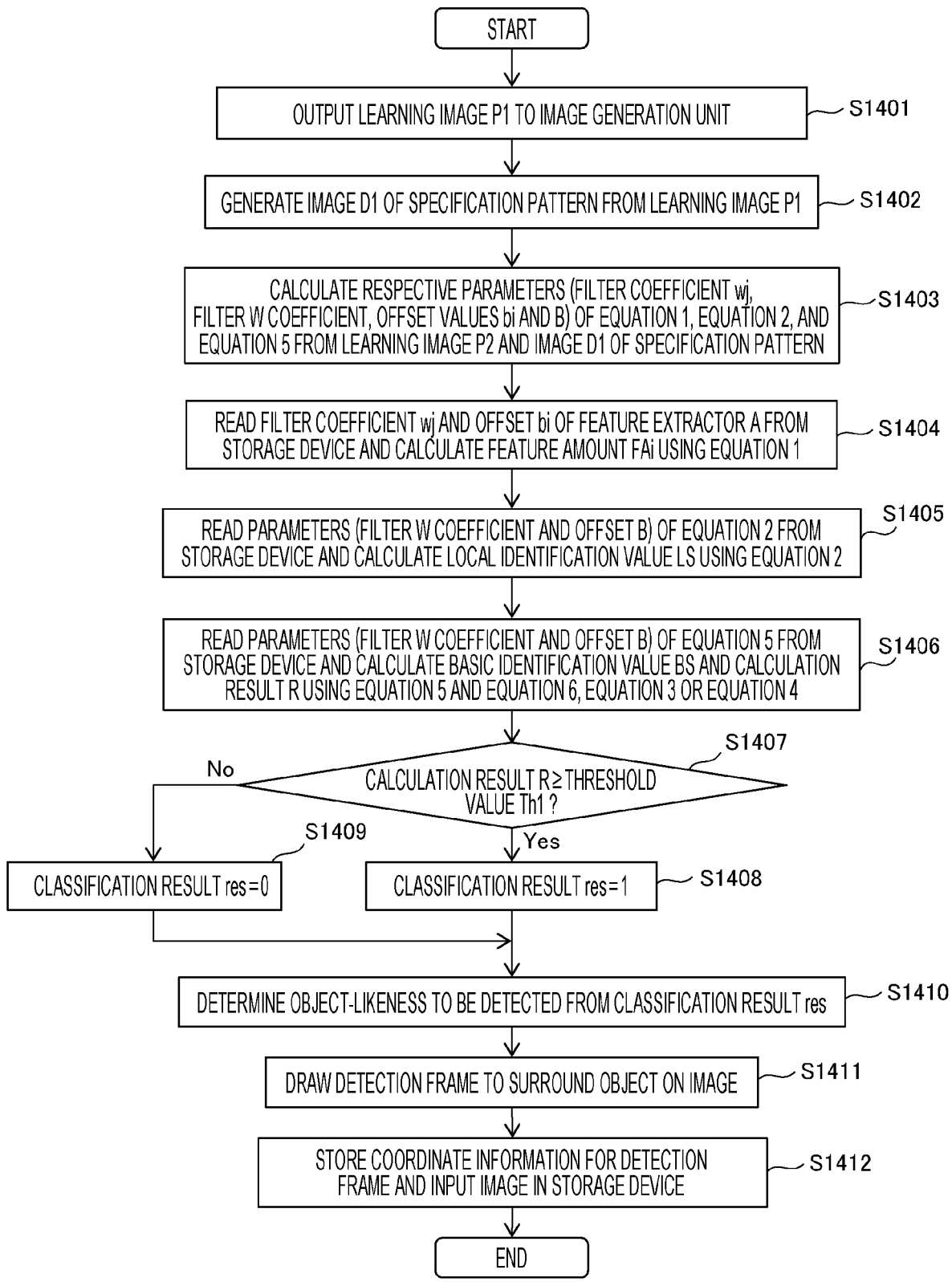
FIG. 14 is a flowchart showing the second embodiment of the present invention and explaining an example of processing performed in an image diagnosis support device 1.

FIG. 14 is a flowchart for explaining the processing of the image diagnosis support device 1 according to the embodiment of the present invention. In the following, each processing unit (input unit 10, feature extraction unit 11, etc.) is described as a processing entity, but the CPU 201 may be read as the processing entity and the CPU 201 may execute each processing unit as a program.

(i) Step S1401

The input unit 10 receives the learning image P2 including the specification pattern and the learning image P1 and the input image A1, and outputs the learning image P1 to the image generation unit 20.

(ii) Step S1402

The image generation unit 20 generates an image D1 of a specification pattern from the learning image P1.

(iii) Step S1403

The learning unit 26 performs machine learning using the learning image P2 and the image D1 of the specification pattern, calculates respective parameters (filter coefficient wj, filter W coefficient, offset values bi and B, etc.) shown in Equation 1, Equation 2 and Equation 5 of the first embodiment, and stores the parameters in the storage device 90.

(iv) Step S1404

The feature extraction unit 11 reads respective parameters (filter coefficient wj, offset value bi) shown in Equation 1 from the storage device 90, and calculates the feature amount FAi of the object of the input image A1 input from the input unit 10 using the filter by Equation 1 described above.

(v) Step S1405

The local identification unit 12 reads respective parameters (filter W coefficient, offset B) shown in Equation 2 described above from the storage device 90, and calculates the local identification value LS by Equation 2.

(vi) Step S1406

The overall identification unit 13 reads respective parameters (filter W coefficient, offset B) shown in Equation 5 described above from the storage device 90, and calculates the basic identification value BS and the calculation result R by Equation 5 and Equation 6, Equation 3, or Equation 4.

(vii) Step S1407

The overall identification unit 13 compares the calculated calculation result R with a threshold value Th1. That is, when the calculation result R≥the threshold value Th1, the process proceeds to step S1408. On the other hand, when the calculation result R<the threshold value Th1, the process proceeds to step S1409.

(viii) Step S1408

The overall identification unit 13 determines that it is a target object (for example, abnormal tissue, abnormal cell, etc.) to be detected for the classification result res, and sets, for example, "1" to the classification result res.

(ix) Step S1409

The overall identification unit 13 determines that it is not an object to be detected (for example, normal tissue, normal cell, etc.), and sets, for example, "0" to the classification result res.

(x) Step S1410

The overall identification unit 13 classifies the lesion-likeness from the classification result res. For example, for the prostate, the result of non-tumor, tumor, or the like is set to the classification result res. Therefore, by using respective parameters calculated by reflecting the additional identification value during machine learning, it becomes possible to accurately calculate the presence or absence (for example, tumor, etc.) of an object (for example, lesion, etc.) or an object-likeness (for example, lesion-likeness) (R=0.69: Range (0-1)).

(xi) Step S1411

When it is classified as an object to be detected (for example, abnormal tissue, abnormal cell, etc.), as shown in FIG. 8 of the first embodiment, the drawing unit 14 draws a detection frame showing the abnormal tissue or abnormal cell on the image and displays it. When it is classified as an object not to be detected (for example, normal tissue, normal cell, etc.), the drawing unit 14 does not draw the detection frame on the image. Further, as shown in FIG. 11, the drawing unit 14 displays the value of the object-likeness (for example, lesion-likeness) to be detected calculated from the input image.

(xii) Step S1412

The recording unit 15 stores the coordinate information for drawing the detection frame on the target image input by the drawing unit 14 and the target image in the storage device 90 (corresponding to the storage device 203).

As described above, according to this second embodiment, the image diagnosis support device 1 performs machine learning on the feature amount of the image so as to preferentially capture the feature of the region in the image indicated by the specification pattern, and calculates respective parameters (filter coefficient, offset, etc.). Then, since the image diagnosis support device 1 generates a classifier that classifies whether or not it is the object to be detected (for example, abnormal tissue or cell), it becomes possible to classify whether or not it is an object to be detected (abnormal tissue, abnormal cell, etc.) from the image while suppressing false detection or over-detection of each object (for example, lesion or the like).

Further, the image diagnosis support device 1 can generate an image D1 of a specification pattern using the learning image P1 that is desired to be learned with particular emphasis in advance, and can calculate the feature amount of the object in the image by using the learning image with an increased number of images and the generated image D1 of the specification pattern. This makes it possible to accurately determine an object or object-likeness (for example, lesion-likeness) in the image while suppressing the generation cost of the image D1 of the specification pattern.

Further, the image diagnosis support device 1, even when the number of learning images is increased and the machine learning is performed again, can accurately determine an object or object-likeness (for example, lesion-likeness) in the image while suppressing the change in the feature amount captured by the machine learning before increasing the number of images.

Third Embodiment

Figure 15:
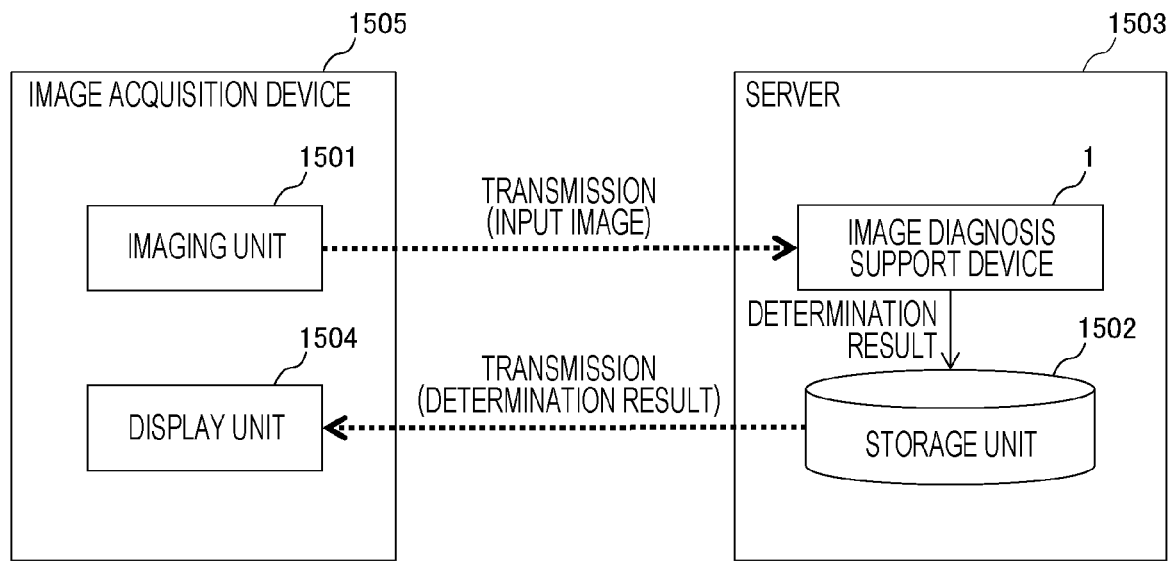
FIG. 15 is a diagram showing a third embodiment of the present invention and showing a schematic configuration of a remote diagnosis support system equipped with an image diagnosis support device.

FIG. 15 is a functional block diagram showing the configuration of a remote diagnosis support system 1500 according to a third embodiment of the present invention. The remote diagnosis support system 1500 has a server 1503 and an image acquisition device 1505.

The image acquisition device 1505 is, for example, a device such as a virtual slide device or a personal computer equipped with a camera, and has an imaging unit 1501 for capturing image data and a display unit 1504 for displaying a determination result transmitted from the server 1503. Although not shown, the image acquisition device 1505 has a communication device that transmits image data to the server 1503 and receives data transmitted from the server 1503.

The server 1503 has the image diagnosis support device 1 that performs image processing according to the first and second embodiments of the present invention on the image data transmitted from the image acquisition device 1505 and a storage unit 1502 for storing the determination result output from the image diagnosis support device 1.

Although not shown, the server 1503 has a communication device that receives image data transmitted from the image acquisition device 1505 and transmits determination result data to the image acquisition device 1505. Further, the server 1503 may be any device including the image diagnosis support device 1 and the storage unit 1502, and is not limited to the server.

The image diagnosis support device 1 classifies the presence or absence of an object to be detected (for example, abnormal tissue or abnormal cell (e.g. cancer)) for an object (for example, tissue or cell) in the image data taken by the imaging unit 1501 of the image acquisition device 1505.

Further, the image diagnosis support device 1 classifies a predetermined object-likeness (for example, lesion-likeness) of an object (for example, abnormal tissue or abnormal cell (e.g. cancer)) according to a state of the object (for example, abnormal tissue or abnormal cell (e.g. cancer)) by using the classification result by the classifier that calculates the feature amount of an object (for example, tissue, cell, etc.) in the input image by using respective parameters calculated by machine learning using the specification pattern in the same manner as in the first and second embodiments. The display unit 1504 displays the classification result transmitted from the server 1503 on the display screen of the image acquisition device 1505.

As the image acquisition device 1505, a regenerative medicine device having an imaging unit, an iPS cell culture device, an MRI, an ultrasonic image capturing device, or the like may be used.

As described above, according to the third embodiment, it becomes possible to provide a remote diagnosis support system by accurately classifying whether or not an object (for example, a tissue, a cell, etc.) in an image transmitted from a facility or the like at a different location is an object to be detected (abnormal tissue, abnormal cell, etc.) by using respective parameters of a classifier reflecting a specification pattern, transmitting the classification result to a facility or the like at a different location, and displaying the classification result on the display unit of the image acquisition device existing at that facility or the like.

Fourth Embodiment

Figure 16:
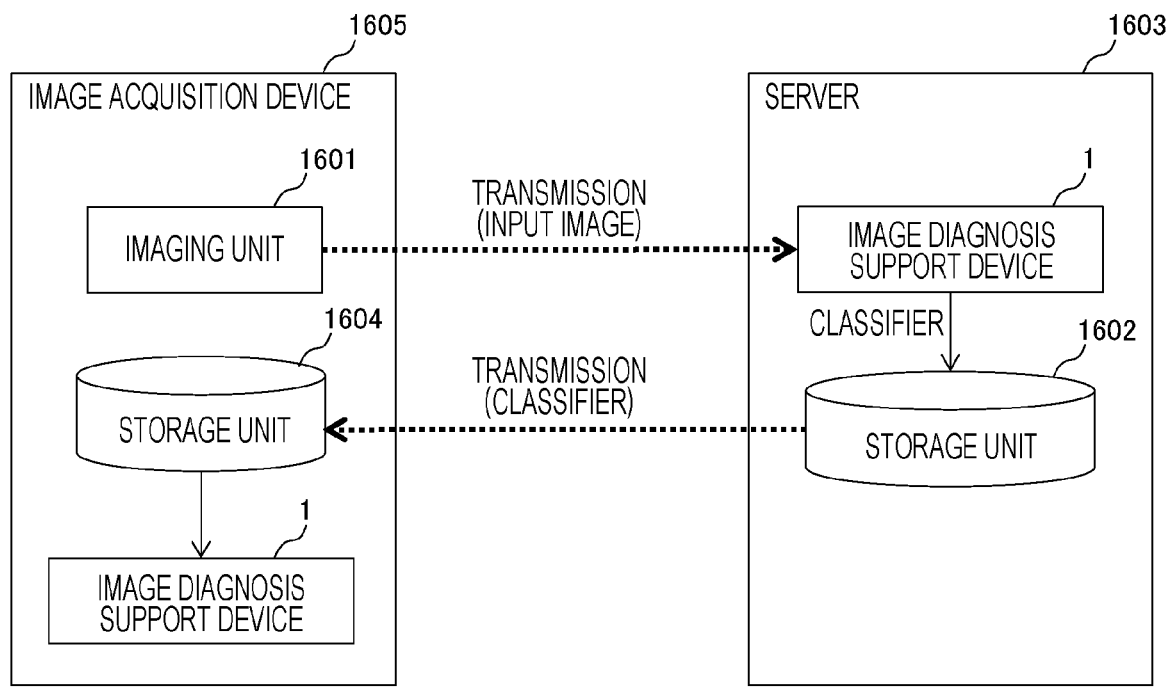
FIG. 16 is a diagram showing a fourth embodiment of the present invention and showing a schematic configuration of a network entrustment service providing system equipped with an image diagnosis support device.

FIG. 16 is a functional block diagram showing the configuration of a network entrustment service providing system 1600 according to a fourth embodiment of the present invention. The network entrustment service providing system 1600 has a server 1603 and an image acquisition device 1605.

The image acquisition device 1605 is, for example, a device such as a virtual slide device or a personal computer equipped with a camera, and has an imaging unit 1601 that captures image data, a storage unit 1604 that stores a classifier transmitted from the server 1603, and the image diagnosis support device 1.

The image diagnosis support device 1 reads the classifier transmitted from the server 1603 and classifies whether or not an object (for example, tissue, cell, etc.) in the image newly captured by the imaging unit 1601 of the image acquisition device 1605 is an object to be detected (for example, abnormal tissue or abnormal cell). The image diagnosis support device 1 performs the same image processing as in the first and second embodiments.

Although not shown, the image acquisition device 1605 has a communication device that transmits image data to the server 1603 and receives data transmitted from the server 1603.

The server 1603 has the image diagnosis support device 1 that performs image processing according to the first and second embodiments of the present invention on the image data transmitted from the image acquisition device 1605 and a storage unit 1602 for storing the classifier output from the image diagnosis support device 1.

Although not shown, the server 1603 has a communication device that receives image data transmitted from the image acquisition device 1605 and transmits a classifier to the image acquisition device 1605.

The image diagnosis support device 1 generates a classifier that calculates a feature amount of an object (for example, tissue, cell, etc.) in the image in a facility or the like at a different location by performing machine learning using a specification pattern so as to determine an object (for example, tissue, cell, etc.) in image data taken by the imaging unit 1601 as an object to be detected (for example, a normal tissue or cell as a normal tissue or cell, or an abnormal tissue or cell as an abnormal tissue or cell). The storage unit 1604 stores a classifier or the like transmitted from the server 1603.

The image diagnosis support device 1 in the image acquisition device 1605 reads a classifier or the like composed of parameters reflecting the specification pattern from the storage unit 1604, and uses the classifier to classify whether or not an object (for example, tissue, cell, etc.) in an image newly captured by the imaging unit 1601 of the image acquisition device 1605 is an object to be detected (for example, abnormal tissue, abnormal cell, etc.), and displays the classification result on the display screen of the output device 204 of the image diagnosis support device 1.

As the image acquisition device 1605, a regenerative medicine device having an imaging unit, an iPS cell culture device, an MRI, an ultrasonic image capturing device, or the like may be used.

As described above, according to the fourth embodiment, a classifier or the like is generated by performing machine learning using a specification pattern so as to classify an object (for example, tissue or cell) in an image transmitted from a facility or the like at a different location as an object to be detected (for example, a normal tissue or cell as a normal tissue or cell, an abnormal tissue or cell as an abnormal tissue or cell), and the classifier or the like is transmitted to a facility or the like at a different location.

Then, it becomes possible to provide a network entrustment service providing system by reading the classifier with the image acquisition device 1605 existing in the facility or the like, and classifying whether or not the object (for example, tissue or cell) in the newly captured image is an object to be detected (for example, abnormal tissue or abnormal cell).

Each of the first to fourth embodiments described above can be modified as follows.

In the feature extraction unit 11 and the learning units 16 and 26, a plurality of feature amounts are calculated by using a filter by machine learning, but other feature amounts such as HOG may be used and have the same effect.

In the overall identification unit 13 and the learning units 16 and 26, the Negative log likelihood is used as the loss function, but a square error, Hinge loss, or the like may be used and has the same effect.

The present invention can also be realized by a software program code that realizes the functions of the embodiments. In this case, a storage medium recording the program code is provided to the system or device, and the computer (or CPU or MPU) of the system or device reads the program code stored in the storage medium. In this case, the program code itself read from the storage medium realizes the function of the above-described embodiment, and the program code itself and the storage medium storing the program code constitute the present invention. As a storage medium for supplying such a program code, for example, a flexible disk, a CD-ROM, a DVD-ROM, a hard disk, an optical disk, a magneto-optical disk, a CD-R, a magnetic tape, a non-volatile memory card, a ROM, or the like is used.

In addition, the OS (operating system) running on the computer may perform part or all of the actual processing based on the instruction of the program code, and the processing may realize the functions of the above-described embodiment. Further, after the program code read from the storage medium is written in the memory on the computer, the CPU of the computer or the like may perform part or all of the actual processing based on the instruction of the program code, and the processing may realize the functions of the above-described embodiment.

Furthermore, the program code of the software that realizes the functions of the embodiment is distributed via a network to be stored in storage means such as a hard disk or memory of the system or device or a storage medium such as a CD-RW or CD-R. The computer (or CPU or MPU) of the system or device may read and execute the program code stored in the storage means or the storage medium at the time of use.

Finally, the processes and techniques described herein are not inherently relevant to any particular device and can be implemented in any suitable combination of components. In addition, various types of devices for general purpose can be used according to the methods described here. It may be beneficial to build a dedicated device to carry out the steps of the method described here. Further, various inventions can be formed by appropriately combining a plurality of components disclosed in the embodiment. For example, some components may be deleted from all the components shown in the embodiment.

In addition, components across different embodiments may be combined as appropriate. The present invention has been described in the context of specific examples, but these are for illustration, not limitation, in all respects. Those skilled in the art will find that there are numerous combinations of hardware, software, and firmware suitable for implementing the present invention. For example, the described software can be implemented in a wide range of programs or scripting languages such as assembler, C/C++, perl, Shell, PHP, and Java (registered trademark).

Further, in the above-described embodiment, the control lines and the information lines are considered to be necessary for the explanation, and not all the control lines and the information lines are necessarily shown as the product. All configurations may be connected to each other.

In addition, to those with ordinary knowledge of the art, other implementations of the present invention will become apparent from the discussion of the specification and embodiments of the present invention disclosed herein. The various aspects and/or components of the described embodiments can be used alone or in any combination.

<Supplementary>

The following are typical viewpoints of the present invention other than those described in the claims

<16>

A remote diagnosis support system, including:
an image acquisition device having an imaging device for capturing image data; and
a server that functions as the image diagnosis support device described in <4> or <7>, in which
the image acquisition device transmits the image data to the server, and
the server processes the received image data with the image diagnosis support device, stores the image of the determined object and the determination result in the memory, and transmits the image of the determined object and the determination result to the image acquisition device, and the image acquisition device displays the received image of the determined object and the determination result on a display device.

<17>

A network entrustment service providing system, including:
an image acquisition device having an imaging device for capturing image data; and
a server that functions as the image diagnosis support device described in <4> or <7>, in which
the image acquisition device transmits the image data to the server,
the server processes the received image data with the image diagnosis support device, stores the image of the determined object and a classifier in the memory, and transmits the image of the determined object and the classifier to the image acquisition device,
the image acquisition device stores the received image of the determined object and the classifier, and
the image diagnosis support device described in <4> or <7> in the image acquisition device determines other images using the classifier and displays the determination result on a display device.

The invention claimed is:

1. A machine learning device for improving accuracy in detecting an object or an object-likeness, the machine learning device comprising:
a processor; and
a memory communicatively coupled to the processor, wherein the processor is configured to:
receive an image and calculate a feature amount of an object included in the image,
identify a local part from the feature amount and calculate a local identification value to determine if the object is an object to be detected, using at least the local part and a value of object-likeness for each of a plurality of local parts,
calculate an overall identification value using the local identification value,
capture features of the local part using the overall identification value,
calculate respective parameters using at least the overall identification value to determine each of at least one target object as a predetermined target object,
calculate a result value indicating the value of object-likeness for each of the at least one target object in the image, and
generate a classifier, for determining if each of the at least one target object is one of the object to be detected or an object-likeness to be detected, using the local identification value, the result value, and the overall identification value and store the classifier in the memory.

2. The machine learning device according to claim 1, wherein
the processor receives a second image including a specification pattern,
the processor calculates an additional identification value from the local identification value and the specification pattern, and
when calculating the overall identification value, calculates the overall identification value from the additional identification value and the local identification value.

3. The machine learning device according to claim 1, wherein
the processor generates an image of a specification pattern showing a specific region,
the processor calculates an additional identification value from the local identification value and the specification pattern, and
when calculating the overall identification value, calculates the overall identification value from the additional identification value and the local identification value.

4. The machine learning device according to claim 1, wherein the processor is further configured to calculated a filter coefficient and an offset value for the feature amount.

5. An image diagnosis support device for improving accuracy in detecting an object or an object-likeness, the machine learning device comprising:
a processor; and
a memory communicatively coupled to the processor, wherein the processor is configured to:
receive an image and calculate a feature amount of an object included in the image,
identify a local part from the feature amount and calculate a local identification value to determine if the object is an object to be detected, using at least the local part and a value of object-likeness for each of a plurality of local parts,
calculate an overall identification value using the local identification value,
capture features of the local part using the overall identification value,
calculate respective parameters using at least the overall identification value to determine each of at least one target object as a predetermined target object,
calculate a result value indicating the value of object-likeness for each of the at least one target object in the image, and
calculate an identification result, for determining if each of the at least one target object is one of the object to be detected or an object-likeness to be detected, using the local identification value, the result value, and the overall identification value.

6. The image diagnosis support device according to claim 5, wherein
the processor receives a second image including a specification pattern,
the processor calculates an additional identification value from the local identification value and the specification pattern, and
when calculating the overall identification value, calculates the overall identification value from the additional identification value and the local identification value.

7. The image diagnosis support device according to claim 5, wherein the processor uses the identification result to determine the presence or absence of the object and the object-likeness in the image.

8. The image diagnosis support device according to claim 5, wherein
the processor generates an image of a specification pattern showing a specific region,
the processor calculates an additional identification value from the local identification value and the specification pattern, and
when calculating the overall identification value, calculates the overall identification value from the additional identification value and the local identification value.

9. The image diagnosis support device according to claim 8, wherein the processor uses the identification result to determine the presence or absence of the object to be detected and the object-likeness to be detected in the image.

10. A machine learning method for improving accuracy in detecting an object or an object-likeness, that performs machine learning of an image on a computer with a processor and a memory, the machine learning method comprising:
receiving an image and calculating a feature amount of an object included in the image;
identifying a local part from the feature amount and calculating a local identification value to determine if the object is an object to be detected, using at least the local part and a value of object-likeness for each of a plurality of local parts;
calculating an overall identification value using the local identification value;
capturing features of the local part using the overall identification value;
calculating respective parameters using at least the overall identification value to determine each of at least one target object as a predetermined target object;
calculating a result value indicating the value of object-likeness for each of the at least one target object in the image; and
generating a classifier, for determining if each of the at least one target object is one of the object to be detected or an object-likeness to be detected, using the local identification value, the result value, and the overall identification value and stores the classifier in the memory.

11. The machine learning method according to claim 10, further comprising:
receiving a second image including a specification pattern; and
calculating an additional identification value from the local identification value and the specification pattern, wherein
the overall identification value is calculated from the additional identification value and the local identification value.

12. The machine learning method according to claim 10, further comprising:
generating an image of a specification pattern showing a specific region; and
calculating an additional identification value from the local identification value and the specification pattern, wherein
the overall identification value is calculated from the additional identification value and the local identification value.

* * * * *